United States Patent [19]

Vignovich et al.

[11] 3,932,166

[45] Jan. 13, 1976

[54] LANDFILL AND SOIL CONDITIONER

[76] Inventors: Martin Vignovich, 3342 N. Senasac Ave., Long Beach, Calif. 90808; Russell B. Sperry, 63945 Highway 97, Bend, Oreg. 97701

[22] Filed: May 15, 1974

[21] Appl. No.: 470,330

Related U.S. Application Data

[63] Continuation-in-part of Ser. No. 260,502, June 7, 1972, abandoned.

[52] U.S. Cl. .......................... 71/11; 71/14; 71/23; 71/37; 71/42; 71/64 SC; 260/639 R; 260/515 H
[51] Int. Cl.² .................. C05F 11/00; C05B 11/04; C05B 11/16; C07C 63/00
[58] Field of Search.................. 71/1, 24, 14, 37–42, 71/64 SC, 11, 22, 23; 260/639, 515 H

[56] References Cited
UNITED STATES PATENTS
2,992,093   7/1961   Burdick .................................. 71/24

FOREIGN PATENTS OR APPLICATIONS
24,085   1897   United Kingdom..................... 71/14

Primary Examiner—Charles N. Hart
Assistant Examiner—Ferris H. Lander
Attorney, Agent, or Firm—Clarence A. O'Brien; Harvey B. Jacobson

[57] ABSTRACT

A method for converting organic waste materials into inert humus-like materials by charring the organic waste materials by heating and drying same in the presence of certain water-soluble inorganic acids, removing residual acid and other water-soluble contaminants by washing the crude char product with water, and utilizing the resulting inert material as a landfill. If desired, the humus-like char products can be reacted with an alkali at elevated temperatures, and the resulting alkali salts of humic-acid-like materials can be mixed with the soil to provide an improved and/or fertilized topsoil.

10 Claims, No Drawings

LANDFILL AND SOIL CONDITIONER

CROSS-REFERENCE TO RELATED APPLICATIONS

This is a continuation-in-part of U.S. application Ser. No. 260,502, filed June 7, 1972, now abandoned.

BACKGROUND OF THE INVENTION

As is well known, the problem of disposing of organic wastes has reached crisis proportions. Originally, waste products from human civilization were disposed of by merely pouring them into lakes and rivers or dumping them on unused land. However, as the human population has grown and as civilization has become more and more complex these are no longer suitable solutions to the problem of waste disposal, because, at the present time, our rivers and lakes have become so polluted that animal and plant life growing therein has gradually been destroyed. Moreover, such a large amount of waste material is now being disposed of in such a manner that even the oceans are no longer adequate to take care of it.

In recent times many methods have been devised to solve the problem of disposing of organic wastes. However, for the most part, the methods are so expensive that so far very little has been done in solving the problem.

In addition to the pollution problem created by the ever-growing population of the world, the excess population has also created a need for more food material. However, arable land is decreasing because of the loss of topsoil, and even if arable land were not decreasing, there would still be a need for more and more food grown on the existing arable land, which, inter ali, requires increased production of cheap and inexpensive fertilizers.

From the foregoing, it is apparent that it is a desideratum in the art to provide an inexpensive method for disposal of organic wastes in a way which would not pollute the environment. Moreover, an excellent solution to the problem of disposing of such wastes would be to utilize them to create topsoil and/or fertilizer in order to better feed the ever-growing population.

The primary object of the present invention therefore is to disclose and provide a method for easily converting organic wastes into inert materials which are easily disposed of without pollution of the ennvironment.

Another object of the present invention is to disclose and provide a process for compacting the diverse organic waste materials of society, such as garbage, sewage solids and manures, rubbish and trash, by converting the wastes into uniform granular char products, of considerably reduced weight and volume, which are suitable for use as non-polluting landfill; by reacting the organic wastes with certain acids under drying conditions, removing residual acid and other water-soluable contaminants by washing the resultant crude char product with water (from which the acid may be recovered for re-use), and utilizing the resulting inert product as a landfill.

Another object of the present invention is to diclose and provide a method for disposing of organic wastes which includes converting said organic wastes into the alkali salts of humic-acid-like materials and mixing said humic-acid-like materials into soil in order to condition or build up the topsoil and/or to fertilize the soil; by reacting the organic humus-like char product of the acid charring of wastes with alkalis at elevated temperatures to produce the alkali salts of humic-acid-like materials, neutralizing said alkali salts with appropriate fertilizing substances (e.g. phosphoric acid), and mixing the resultant materials into the soil.

SUMMARY OF THE INVENTION

The present invention provides a process for converting the organic waste materials of civilization into uniform, nonflamable, non-offensive and useful products. This invention converts these organic wastes into dry, easily friable materials of considerably reduced weight and volume, which greatly facilitates handling and transportation while simultaneously aiding disposal of such waste materials by extending the capacities of landfill sites. Another benefit of the process of this invention is the conversion of the aforesaid organic wastes into easily friable alkali salts of humic-acid-like materials, which can be utilized as topsoil conditioners and/or fertilizers. Said alkali salts of the humic-acid-like material can be produced so as to contain potash, nitrogen, phosphates, and other minerals and trace elements which normally will be present in the organic waste materials of human society.

The present invention converts such diverse organic waste materials as animal manure and sewage solids, paper and grass clippings, coffee grounds and table scraps, into useful products. Moreover, the present invention simplifies sewage treatment by allowing present facilities to be used primarily for purification of the liquids because the present invention can be utilized on the sewage solids, thereby eliminating the time-consuming digestion of sewage solids presently performed by sewage treatment plants.

Additionally, the present invention is able to convert agricultural wastes and industrial wastes having substantial carbohydrate and protein content to useful products, such waste materials including: wood, sawdust, straw, cardboard, cane bagasse, oat hulls, cottom gin wastes, animal manures, bark, paper, etc.

The present invention converts all of the above wastes into a dry, easily friable, inert black product, somewhat resembling natural humus, by charring the waste materials by reacting them with certain acids at moderately high temperatures (about 220° to 240°F) under strongly dehydrating conditions. When freed of residual acid and other water-soluble contaminants by washing with water, this humus-like char product can be utilized as a landfill, and additionally may be useful as an intermediate for the production of chemicals such as plastics or fuels by, e.g., hydrogenation, pyrolysis, catalytic reductive cracking, gasification as with coal, etc. Reaction of the humus-like char product with alkalis at elevated temperatures (about 500°F) yields the alkali salts of high-molecular-weight polycarboxylic acids which resemble natural humic acids, $(C_{40}H_{30}O_{13})_n$, and which can be utilized as soil conditioners, fertilizers, flocculants, etc.

Generally speaking, the excellent results of the present invention are obtained by adding a certain amount of water soluble inorganic acid to the shredded or ground waste materials and heating this mixture of acid and waste under strongly dehydrating conditions to a sufficient temperature and for a sufficient length of time to "char" the material. During this charring process gasses are given off, which primarily consist of $SO_2$, $NO_2$, and other acid gasses which can be prevented from contaminating the atmosphere by passing them through alkaline scrubbing towers, etc. The resulting inert black humus-like product is insoluble in water; it can be freed of residual acid and other water-soluble contaminants by washing it with water, from which the acid can be recovered for re-use where economically feasible. The easily-friable black humus-like product thus formed can be utilized as an inert, non-polluting landfill. If desired, the inert, black humus-like product can be mixed, wet or dry, with a strongly alkaline material and this mixture heated to a temperature above 240°F, and preferably above 450°F, which causes the humus-like product to react with the alkaline material, forming the water-soluble alkali salts of black, humic-acid-like materials.

During the charring process it is believed that the acid is acting as a dehydration catalyst to change the cellulose and other carbohydrates, protein, and fats, etc. found in organic waste material into the inert humus-like char product. Maximum shredding, grinding, and pre-soaking of the organic waste material with acid will insure complete contact of the acid with the waste material which substantially reduces the amount of acid utilized and the length of time required to obtain complete charring.

Some of the acid utilized during the charring process will be neutralized by the ammonia, amines, and other cations present in the raw material. The free acid remaining after charring can be recovered from the crude char product by washing it with water, or the residual acid can be neutralized by adding e.g. ammonia or potassium hydroxide in order to increase the fertilizing capacity of the product. Since the humus-like char product is insoluble in water, when washed free of residual acid and soluble salts it is an inert, non-polluting material, suitable for use as landfill. Also, since the weight and volume of the char product are reduced by 40% or more as compared to the raw waste materials, this would greatly extend the capacity of landfill sites. Furthermore, being inert, the humus-like product can be used to loosen heavy soils just as sand or silt does; in this case neutralizing the residual acid in the crude char product with suitable alkaline compounds will add fertilizing properties to the soil filler or loosener.

DESCRIPTION OF THE PREFERRED EMBODIMENTS

The charring process is more economical if the acid is thoroughly dispersed in the organic waste material so that the acid will contact as much of the organic waste material as feasible. In order to insure this, it is preferred if the organic waste material is crushed, ground, or chopped into small pieces, depending on the particular organic waste material being treated. These relatively small particles of organic waste material are then allowed to remain in contact with the acid until all of the waste material has been penetrated by the acid.

Where the waste materials, such as city rubbish, contain metals, glass, etc., it is preferred that the current processes for shredding and removing metals, glass etc. be utilized prior to treating the organic waste material with the acid.

With finely divided, absorbent solids, uniform contact of all the solid with concentrated acid is readily accomplished. With coarse solids such as wood chips, however, which absorb the acid slowly, it is desirable that the waste be soaked in a large volume of dilute acid long enough to allow complete penetration and wetting of the solid waste by the acid solution. After soaking, it is generally desirable that any excess acid solution be removed. This can be accomplished by any convenient means such as filtering or squeezing the organic waste material between screens or rollers, leaving the waste uniformly wet with sufficient acid to effect the desired charring. It should be noted that this is not critical, but only convenient, inasmuch as if it is desirable that the organic material be neutralized after charring, less alkali will be required to neutralize the residual acid if any acid in excess of that required to effect charring has been removed prior to the charring. It is self evident that city rubbish, for example, might contain cement, plaster, or other caustic materials which would neutralize a portion of the acid used. This is no problem when an excess of dilute acid is used to soak the waste prior to charring, but the presence of such caustic materials should be taken into account when determining the amount of acid needed when the material is simply wet with acid and charred.

Acids which are generally usable in the present invention are inorganic water-soluble mineral acids such as $SO_3$, sulfuric acid, and hydrochloric acid. The term water-soluble inorganic acid includes those water-soluble salts which when dissolved in water produce a strong acid and a weak base which will not neutralize the strong acid. Exemplary of such water-soluble acid-producing salts are aluminum chloride, $AlCl_3$; ferric chloride, $FeCl_3$; zinc sulfate, $ZnSO_4$; sodium hydrogen sulfate, $NaHSO_4$; and similar chlorides, sulfates and mono-hydrogen sulfates.

The use of the various acid-producing salts such as those listed above suggests that many industrial waste acids can be used in the charring step. Such waste acids or sludges which can be used would contain the acid-producing sulfates or chlorides of copper, tin, iron, nickel, chromium, aluminum, zinc, etc. The crude chars thus obtained might in some cases be acceptable as landfill when neutralized with appropriate alkaline materials such as lime, limestone, or soda ash, provided the nitrate ion concentration in the product were kept below a specified level. Where such chars are to be further converted to the humic-acid-like soil conditioner/fertilizer mixes, the industrial wastes can be selected for incorporation into the acid charring step so that the final product would contain the most beneficial concentrations of various metal ions and trace elements.

From the foregoing, it is apparent that the important criterion of the acid charring step is to have the organic waste in contact with hydrochloric or sulfuric acid, regardless of the state in which the acid is added to the organic waste material, during the heating and drying process which forms the char.

Since the acid is acting as a catalyst, and is concentrated during the heating and drying processes of the charring step, the starting concentration of the acid is not important, and one can utilize 98% or 100% acid to as low as 10% or even 5%, and still obtain the char. Economic considerations suggest that as little water be added with the acid as processing details permit, since this water along with water formed in the deyhdration reaction in the charring step must be evaporated. Similarly, the total amount of acid added to the organic waste material is not particularly critical: as little as 3% acid based on the weight of the raw waste material will cause substantial charring and weight reduction, whereas if maximum weight reduction and/or maximum conversion of the waste to the humus-like char product is desired, the weight ratio of acid to waste material should be about 8% to 10% or higher. However, utilizing large amounts of acid will entail removing considerable residual acid after the charring process is completed, or in the alternative, utilizing large amounts of alkali material to neutralize the residual acid. Therefore, it is preferred if the amount of available acid utilized is less than about 50%, with the preferred range being from 5% to 20% by weight, based on the dry weight of the organic waste material.

The rate and extent of charring are variable, and depend to some extent on the temperature of reaction and the starting concentration of the acid used. For example, utilizing a concentrated acid results in more rapid charring and lower starting temperatures may be used. The temperature at which the charring starts will vary from around 180°F when concentrated sulfuric acid is used, to above about 212°F with dilute acid, since both the water of dilution and the water formed in the charring process must be evaporated as the char forms.

If concentrated sulfuric acid in the amount of about 50% or more by weight of the organic waste material is added, an extreme exotherm can occur even when the starting materials are at room temperature if the organic waste material contains moisture. The initial rise in temperature is no doubt due to the high heat of hydration of $H_2SO_4$. Though charring appears to start in concentrated sulfuric acid at about 180°F, it is impossible to determine the temperature exactly, since in the laboratory the heat of reaction and hydration raises the temperature of the reaction mass to above 350°F within seconds. Excessive oxidation is evident under these conditions, since large amount of $SO_2$ are evolved at the higher temperature. Charring with concentrated sulfuric acid could be controlled by mixing the acid and waste just prior to spraying them into an air cyclone, for example, where the reaction temperature would be controlled by the temperature of the large volume of air involved, to between about 220° and 240°F. In this case, the crude char product would contain a very large amount of residual acid, which could be removed by washing with water and then concentrated for re-use.

When dilute acids, e.g., sulfuric acid of less than about 90% concentration, are used, in order to obtain maximum yields of the desired humus-like char product the reaction must be carried out at temperatures above about 212°F under conditions which remove the water, thus concentrating the acid, as rapidly as possible so as to minimize decomposition side-reactions. Since both the water used in diluting the acid and the water formed by the dehydration charring reaction must be removed rapidly once heating is begun, it is preferred that the charring reaction be carried out at about 220° to 240°F. However, since charring with concentrated sulfuric acid starts at around 180°F this lower temperature could be employed if a special means of rapidly removing water from the zone of reaction were also used. For example, the charring of the organic waste with concentrated sulfuric acid at 200°F under partial vacuum would be entirely satisfactory. The acid catalyzed dehydration reaction has also been carried out in refluxing toluene, using benzene sulfonic and toluene sulfonic acids, or sulfuric acid, as catalysts. In this case the water was removed from the zone of reaction by the toluene and collected from the refluxing toluene by a water trap. This would not appear practical in terms of preparing a landfill or fertilizer/soil conditioner. However, it might be the most economical procedure for preparing a humus-oil slurry for converting the humus to liquid and gaseous fuels and other useful chemicals by processes similar to those used for gasification, reductive cracking, and liquification of coal. That is, sufficient toluene or similar solvent, along with the acid catalyst, could be added to a slurry of the organic waste material in an appropriate fraction of oil. Subsequent heating while refluxing the solvent would remove the water as the humus formed, the solvent could then be distilled off for re-use, leaving the humus slurried in the oil in what may be an excellent form for subsequent hydrogenation, etc.

Commercially, the charring process would be carried out in various suitably designed equipment, most likely rotary kilns, continuous tray dryers, or hot-air-cyclone reactors, etc.

If volatile acids or acid-producing gases such as HCl or $SO_3$ are used, it is necessary to carry out the charring reaction in a system wherein the acid volatilized along with the water produced in the dehydration process is recovered. Excess acid can be used initially, or the acid concentration in the reaction zone can be augmented periodically as required to maintain the charring reaction. When HCl is added as an aqueous solution of $AlCl_3$ or $FeCl_3$, etc., this volatilization does not occur to any significant extent. An advantage of the use of HCl is that reaction conditions might be so controlled that most of the HCl would be driven off during the charring process, leaving a char product nearly free of residual acid.

One can tell when the reaction is completed in forming the humus-like char product, because this char is black, resinous, water-insoluble material. The crude reaction product also contains residual acid and other water-soluble contaminants which are absorbed onto the easily friable humus-like char material. These residual acids and water-soluble contaminants can be removed by washing the crude char product with water, from which they may be recovered if desired. The washed char product is an inert material, well suited to use as a non-polluting landfill. Alternatively, if it is desired that the char product be used as a soil loosener, etc., wherein the water-soluble side-products might be of value as fertilizers, it is preferable that the residual acid be neutralized by the addition of alkaline substances of fertilizing value, such as ammonia, potash, or lime, etc., rather than washing the crude char product.

The humus-like char product can be converted to the water-soluble alkali salts of black, humic-acid-like materials by reacting the char product with alkalis at elevated temperatures. After the crude char is washed or neutralized, the char is then mixed with an alkali-metal or alkaline-earth hydroxide, or an alkali metal carbonate or silicate, or a mixture of an alkaline earth carbonate with hydroxide, both the char and the alkaline material being in powder form, or slurried together in a water solution. This mixture is then heated to above 240°F when the alkaline material used is e.g. potassium hydroxide, or above 450°F when other less alkaline materials are used, which causes the humus-like char product to react with the alkaline material, producing the water-soluble alkali salts of the black humic-acid-like materials. These salts can be neutralized for use as soil conditioners and fertilizers, preferably by adding phosphoric acid, potassium dihydrogen phosphate, ammonium dihydrogen phosphate, or other suitable acidic materials which would augment the fertilizing capacity of the final product. If desired, the humic-like acids can be recovered from solutions of the alkali salts by acidifying the solutions and filtering off the resultant humic-acid-like precipitates.

The precise temperature of the reaction of the humus-like char product with the alkaline material depends on the strength and concentration of the hydroxides, carbonates, or silicates used. The amount of alkali used is not critical, as partial converson of the inert humus-like char to the soil-conditioning humic-acid-like materials will occur with a dry weight ratio of about 5% alkali to humus-like char. Where essentially complete conversion is desired, it is necessary to use about 30% by weight of sodium hydroxide based on the dry weight of the humus-like char, or an equivalent amount of any of the other alkaline materials, for example 40% by weight of potassium hydroxide.

EXAMPLES

In the following examples, which are solely for the purpose of clarification and are not to be considered limiting, the temperatures given are in degrees Fahrenheit unless expressly stated otherwise. Unless specifically stated otherwise, all the charring reactions described below were carried out in a pre-heated drying-oven, with the acid-soaked raw organic waste material spread out in a thin, ½ to 1 inch layer in a shallow pyrex dish, so as to favor rapid evaporation of water from the reaction zone.

I. Conversion of Organic Wastes to Humus-like Char Products

Several samples approximating normal garbage were prepared as follows: each sample totalled 100 grams, containing 10 grams of each of the following: sawdust, paper (½ inch squares), thin cardboard (½ inch squares), heavy corrogated cardboard (½ inch squares), coffee grounds, sausage, egg shells, canned whole kernel corn, peanuts, carrots, and bones with meat and gristle. The last five ingredients were crushed to pieces of approximately ⅛ inch or smaller before being added to the mix.

EXAMPLE 1

To the first sample 5 ml. of conc. (93%) $H_2SO_4$ mixed with 195 ml. $H_2O$ was added, the mixture was stirred and allowed to stand for one hour. After one hour, the excess liquid was removed by squeezing the sample between two coarse strainers. Approximately 110 ml. of a light brown acidic liquid of pH 1 or lower was recoverd. The sample was then placed in a preheated drying oven at approximately 200°F. After one hour, no reaction was apparent. After several hours a slight charring occurred on the edges of the mass. After overnight (16 hour) heating at higher temperatures (up to 270°F), the sample was almost entirely charred, some of the thicker pieces were brown rather than black, however, and there were a few pieces of peanuts which had not blackened. Egg shells also did not blacken. Two minutes grinding broke the dry product into a coarse shiny black powder, with bits of egg shell and a few large pieces of brownish black material. Total weight: 65.2 grams.

EXAMPLE 2

To the second sample, 10 ml. of conc. (93%) $H_2SO_4$ mixed in 190 ml. of $H_2O$ was added. This sample was then processed as in the first example, 105 ml. of liquid being removed after soaking. This sample also did not char appreciably during the first hour, but was slightly charred after three to four hours, and was completely charred after overnight heating. Except for the egg shells, the sample produced a very fine and uniform dull black dry powder, with only a very few larger pieces of a brownish-black color. Total weight: 49.0 grams.

EXAMPLE 3

To the third sample, 15 ml. of conc. (93%) $H_2SO_4$ mixed with 185 ml. $H_2O$ was added, 110 ml. of liquid was recovered after soaking one hour. This sample was considerably charred after one hour's heating. Grinding the completely charred mix after overnight heating produced a coarse, slightly flocculent black powder, containing bits of egg shell and a very few slightly larger brownish-black pieces. Unlike the other two samples, there was a slight somewhat sweet odor, similar to certain plant foods or artificial fertilizers. Total weight: 71.4 grams.

EXAMPLE 4

The fourth sample was soaked in a mixture of 60 ml. conc. HCl and 140 ml. $H_2O$ for one-half hour. The treatment and results were identical to samples 1 and 2. 49 grams of dry black solid were produced, which appeared only slightly more charred than samples 1 or 2.

EXAMPLE 5

Samples of raw sewage sludge and fresh horse manure were obtained from the Hyperion Sewage Treatment Plant in El Segundo, Calif., and from the Long Beach Riding Stables, Long Beach, Calif., respectively. Two samples of the manure were treated as follows:

a. 50 grams of manure was mixed with 10 ml. of conc. $H_2SO_4$ dissolved in 40 ml. $H_2O$.

b. 50 grams of manure was mixed with 50 ml. of conc. HCl.

Both samples were heated at 240°F for about one hour, sample (a.) yielded 22 grams of black char, sample (b.) yielded 7.5 grams of brown char. Neither dark char was soluble in water.

EXAMPLE 6

Four samples were prepared from the sewage sludge:

a. 100 ml. of raw sewage was mixed with 20 ml. of conc. (93%) $H_2SO_4$.

b. 100 ml. of raw sewage was mixed with 10 ml. of conc. $H_2SO_4$.

c. 100 ml. of raw sewage was mixed with 50 ml. of conc. (37%) HCl.

d. 100 ml. of raw sewage was mixed with 25 ml. of conc. HCl.

These samples were heated overnight at 240° – 260°F. Sample (a.) yielded 16.5 grams of a black, rubbery char; sample (b.) yielded 10.1 grams of a dry cake char; sample (c.) yielded 7.5 grams of gummy black char; and sample (d.) yielded 7.5 grams of a slightly gummy black char.

EXAMPLE 7

Three 20-gram samples of "garbage" were prepared, each consisting of 2 grams sawdust, 2 grams paper, 2 grams cardboard, 2 grams coffee grounds, 2 grams egg shells, 2 grams ground bone and gristle, 2 grams crushed carrots, 2 grams sausage, 2 grams peanuts, and 2 grams crushed corn.

a. The first sample was sprayed during mixing in a blender with 2.0 grams of $H_2SO_4$, using a medical atomizer. The cardboard began to disintegrate into loose fibers as soon as the first of the acid was added. Heating the same at 240°F for an hour produced 11.5 grams of dark black dry char which powdered easily.

b. The second sample was sprayed with 5 grams of conc. HCl. Heating overnight at 240° – 260°F produced 13.2 grams of brown, partially-charred material.

c. The third sample was sprayed with 10 grams of conc. HCl. 14 grams of partially-charred material resulted.

EXAMPLE 8 a. 100 grams of raw sewage sludge from the Lomita Sewage Treatment Plant was dried on a hot plate for 10 minutes, yielding 5.5 grams of dry fibrous residue and ash. It appears that the water content of the sludge is in excess of 90%.

b. 7.5 grams of residue (as above) was pulverized in a blender, and 3.5 grams of $H_2SO_4$ was sprayed into the stirred material. 10.0 grams of the acid-wetted matter was heated at 240°F for about 3 hours, yielding a black fibrous char with a few pieces of unreacted tan or grey fibers which had apparently not been wetted by the acid. 6 grams of crude char was produced.

EXAMPLE 9

Three sample were prepared by mixing raw sewage sludge from the Lomita Sewage Treatment Plant with sawdust. These samples were treated with $H_2SO_4$ and charred as follows:

a. 10 ml. of conc. $H_2SO_4$ was added to 70 grams of sludge, and the resulting mixture was mixed with 30 grams of sawdust. After standing for 1 hour to insure thorough wetting of the sawdust, the mixture was heated to 240°F for about 2 hours. The resultant crude char was rinsed with $H_2O$ and dried, yielding 6.5 grams of humus-like char material.

b. 10 ml. of $H_2SO_4$ was mixed with 80 grams of sludge, then this mixture was added to 20 grams of sawdust and stirred thoroughly and treated as in the above examples. This procedure yielded 15 grams of rinsed and dried humus-like char.

c. 10 ml. of $H_2SO_4$ was mixed with 90 grams of sludge and 10 grams of sawdust as above, which yielded 18.3 grams of unrinsed char which gave a pH of about 2 when rinsed in 500 ml. of $H_2O$. After rinsing and drying, the humus-like char weighed 13 grams.

EXAMPLE 10 a. 20 grams of garbage as in (9) above, were preheated to 240°F, then sprayed with 2 ml. of $H_2SO_4$ using a medical atomizer. Charring of the sample occurred immediately wherever droplets of the acid made contact with it. Subsequent overnight heating resulted in complete charring except where no acid had contacted the bottom of the sample.

b. 20 grams of garbage was preheated to 240°F, then sprayed with con. HCl using a medical atomizer. The 4.5 ml. of acid used produced copious fumes, and appeared to evaporate from the hot sample before sufficient contact for charring. Subsequent heating overnight produced a sample which was only slightly charred. Reaction with HCl apparently must be done under conditions where the acid is allowed to soak into the sample or is constantly added to the zone of reaction.

EXAMPLE 11 a. 100 grams of similar shredded rubbish mix, uniformly wetted with 50 grams of 50% sulfuric acid, was placed in a 1 liter flask equipped with a sealed stirrer and set up to operate at the reduced pressure obtained by a water aspirator. The waste was stirred at 76°F under the indicated partial vacuum for about ½ hour; no blackening of the solids occurred. The reaction flask was then immersed above the level of the solids in a water bath preheated to 200°F. Within a few minutes some of the solids began to blacken. At the end of three hours heating at 200°F the solids appeared totally black and dry. The crude char product was washed and dried to yield 62 grams of the black, humus-like product. Upon fusion with NaOH by the method described in example 12, below, a high conversion to black humic-acid-like material was obtained.

b. In a similar preparation, using 30 grams of $FeCl_3$ dissolved in water in place of the sulfuric acid, 56 grams of black humus-like product was obtained.

EXAMPLE 12 a. 10 grams of shredded organic waste mix was mixed with 150 ml. toluene in a flask equipped with a reflux condenser and water trap. During about ½ hour of refluxing to dry the system, 0.6 ml. of water collected in the trap; no apparent change in color was noted. One ml. of concentrated (93%) sulfuric acid was then added, and refluxing continued. The organic solids began to turn black, and water again began to collect in the trap almost immediately. Refluxing was continued until no more water was collecting in the trap, a total of 3.7 ml. of water was collected, the solids were considerably blackened. A second ml. of sulfuric acid was added and refluxing continued. Further water collected, giving a total of 4.6 ml. water. The crude black char was separated from the toluene by filtration, washed with water, and dried, yielding 4.8 grams of black humus-like product. 2 grams of this humus-like material was intimately ground with 2 grams of KOH (C.P.) and the mix gently heated over a flame in a metal spoon while stirring, until a soft melt was formed. The black melt was dissolved in 100 ml. of water, giving a dark reddish-black strongly alkaline solution from which only a trace of insoluble material was removed by filtration. The solution was acidified with dilute acid; a voluminous precipitate of black humic-acid-like product was formed, which slowly settled leaving a colorless water layer.

b. Almost identical results were obtained using 3 grams of benzene sulfonic acid in place of the sulfuric acid to yield 5.2 grams of the humus-like product from 10 grams of shredded organic waste.

Water-Soluble Acid-Producing Salts and Acid Sulfate Salts

The procedure is essentially the same as with the mineral acids; the waste material is soaked in a water solution of the salt, the excess solution drained or filtered off, and the material charred by heating.

EXAMPLE 13

Four samples approximating "normal" garbage were prepared as in (7) above.

a. 20 grams of garbage was soaked for one-half hour in 50 ml. of solution containing 10 grams of $AlCl_3 \cdot 6H_2O$. The sample was then heated to 240°F. Slight charring occurred after one hour, and moderate charring occurred after overnight heating. 13 grams of unwashed char was obtained, which produced a pH of 6 in 100 ml. of water used as a rinse. Further rinsing and drying yielded 13 grams of black to brown humus-like char, mixed with some uncharred paper and cardboard.

b. 20 grams of "garbage" was soaked for one-half hour in 50 ml. of solution containing 10 grams of $FeCl_3 \cdot 6H_2O$. Upon heating to 240°F, some charring was observed almost immediately. Overnight heating at 240°F resulted in a dry dark black char. There was no evidence of uncharred starting material. 11 grams of unwashed char was produced, which gave a pH of 3 to the first 100 ml. of wash water. Further rinsing and drying yielded 9 grams of humus-like char.

c. 20 grams of garbage was soaked for one-half hour in 50 ml. of solution containing 10 grams of $ZnSO_4 \cdot H_2O$. Treatment as above yielded 13.5 grams of unwashed, partially-charred material, which produced a pH of 6 in 100 ml. of wash water. The rinsed and dried char weighted 10 grams.

d. 20 grams of garbage was soaked for one-half hour in 50 ml. of $H_2O$ containing 10 grams of $NH_4HSO_4$. Charring was nearly complete after overnight heating at 240°F. 14 grams of unwashed char was produced, which gave a pH of 2 in 100 ml. of rinse water. After rinsing and drying, the humus-like char weighed 12.5 grams.

Rinsing the Char

In examples (9) (a), (b), (c), and (13) (a), (b), (c), and (d) above, the char was crushed, soaked or slurried in tap water, and the excess water decanted. The wet char was then placed on a No. 200 mesh screen, and remaining water drained off. This process was repeated with each sample until the rinse water showed a pH of 7.

Examples (15) (a–i), (b–i), (c–i), (17) and (18) below, illustrate the poor results of not rinsing the char prior to alkali fusion. If the sample is not rinsed, the residual acid, especially in the sulfuric acid-produced chars, requires that excess alkali be added in order to neutralize the acid so that the alkali fusion can occur.

Preparation of Humic Acid Salts

A. Using alkali Metal or Alkaline-Earth Hydroxides.

EXAMPLE 14 a. 6 grams of dry humus-like char and 6 grams of NaOH (C.P.) were ground together, charged into a small pressure bomb, and heated at 480° – 500°F for one hour. The fused mass was dried to a constant weight of 11.5 grams. The resultant brownish black salts were very soluble in water.

b. 6 grams of humus-like char and 4.8 grams of NaOH treated as above yielded 10.4 grams of soluble sodium salts.

EXAMPLE 15

Three 10-gram samples from each of the above powdered chars, examples (1) through (3) above, were soaked with 25 ml. samples of $H_2O$ containing KOH to prepare the following nine samples for alkali-fusion tests:

a.

i. 10 grams of char (1) and 2 grams of KOH in 25 ml. $H_2O$.
ii. 10 grams of char (1) and 5 grams of KOH in 25 ml. $H_2O$.
iii. 10 grams of char (1) and 8 grams of KOH in 25 ml. $H_2O$.

b.

i. 10 grams of char (2) and 2 grams of KOH in 25 ml. $H_2O$.
ii. 10 grams of char (2) and 5 grams of KOH in 25 ml. $H_2O$.
iii. 10 grams of char (2) and 8 grams of KOH in 25 ml. $H_2O$.

c.

i. 10 grams of char (3) and 2 grams of KOH in 25 ml. $H_2O$.
ii. 10 grams of char (3) and 5 grams of KOH in 25 ml. $H_2O$.
iii. 10 grams of char (3) and 8 grams of KOH in 25 ml. $H_2O$.

The nine samples were allowed to soak for 3 hours to achieve uniform wetting of the char with the KOH solution, and then dried for one-half hour in an oven at about 250°F.

The samples were then transferred to a high-temperature oven and heated for 45 minutes. The initial oven temperature was 350°F., and the maximum temperature reached was 440°F, at the end of the heating period.

The samples were then tested for solubility in water:
Solubility of char samples:

a. Char (1) — Insoluble — black particles floated on top settled to bottom.
b. Char (2) — Insoluble — same as above.
c. Char (3) — Insoluble — same as above.

Solubility of alkali fusion samples:

a.

i. Very slightly soluble — formed a brown color in $H_2O$.
ii. Soluble — formed a dark brown color, few solids left.
iii. Soluble — same as above.

b.

i. Very slightly soluble — formed a faint brown color in water.
ii. Soluble — dark brown, few solids left undissolved.
iii. Soluble — same as above.

c.

i. Insoluble — water remained clear, black solids settled or floated.
ii. Soluble — brown color in $H_2O$.
iii. Soluble — dark brown color.

EXAMPLE 16

A 25-gram sample of the HCl-char sample (4) above, was then prepared for fusion with KOH by soaking the sample in 50 ml. of a solution containing 0.2 grams of KOH per ml. There was a slight brownish color produced in the liquid portion of this slurry, indicating that some of the crude char was dissolving in the KOH solution. The sample was dried at 240°F.

The samples were then placed in an oven at 530°F. for above five minutes. Product yield and solubility was then determined after cooling the sample.

Char (4) yielded 29.5 grams of product. The dark brown solid which resulted was soluble in water and had a pH of 9 or 10.

EXAMPLE 17

The chars from samples (5) (a.) and (b.) were soaked with KOH solution as follows:

a.

i. 10 grams of char (5) (a.) was mixed with 25 ml. of solution containing 5 grams of KOH. The slurry became hot and gave off steam, indicating that not all the acid had evaporated during heating.

ii. 7.5 grams of char (5) (b.) was mixed with 25 ml. of solution containing 5 grams of KOH. This char did not wet easily, and soaked up more liquid than char 1).

These were then dried at 240°F for two to three hours. The dry sample (ii.) was moderately soluble in water, yielding dark brown solutions. This indicates partial fusion even at this low temperature. Further heating, at 530°F for five minutes, yielded a black powder from sample (i.), and a dark brown powder from sample ii.

b. The solubility of the black sample (i.), even after heating at 530°F, was negligible. o.25 grams placed in 50 ml. of $H_2O$ yielded a pH of 3, indicating that the KOH had been insufficient even to neutralize the acid remaining in the char. This sample was treated with 10 ml. of reagent KOH solution, and again dried at 240°F. The pH of the mixture before drying was about 13. After this second KOH treatment and heating, the sample was transformed into a brown material of moderate solubility, 0.5 grams of which in 50 ml. of $H_2O$ gave a pH of 11.

The solubility of the dark brown sample (ii.) was quite high. The pH of the dark brown solution was about 9.

EXAMPLE 18

The crude chars from the sewage, example (6) above, were prepared for fusion with KOH as follows:

a.

i. 10 grams of char (6) (a.) was mixed with 25 ml. of solution containing 5 grams of KOH.
ii. 10 grams of char (6) (b.) was mixed with 25 ml. of solution containing 5 grams of KOH.
iii. 7.5 grams of char (6) (c.) was mixed with 25 ml. of solution containing 5 grams of KOH.
iiii. 7.5 grams of char (6) (d.) was mixed with 25 ml. of solution containing 5 grams of KOH.

The slurry of char (6) (a.) and KOH became hot and gave off steam, indicating excess acid remained. Char (6) became warm.

The slurries were dried overnight at 240° – 260°F, and then heated to 530°F for five minutes.

b.

i. Sample (i.) yielded a gray powder containing some white chunks. The sample was not soluble. 0.25 grams placed in 50 ml. of $H_2O$ gave a pH of 3, indicating acid remained after heating. This sample was then soaked in 10 ml. of reagent KOH, and dried at 240°F. After this second attempt at fusion with KOH, the sample was transformed into a brown material which was highly soluble, yielding a dark brown solution. 0.5 grams in 50 ml. of water gave a pH of 11 or above.

ii. Sample (ii.) yielded a gray powder which was not soluble. 0.25 grams in 50 ml. of water gave a pH of 6. This sample was also soaked with 10 ml. of KOH and dried, as above. The results of the re-treatment with KOH were the same as with sample (i.) above. 0.5 grams of sample (ii.) yielded a dark brown solution in 50 ml. of water, having a pH of 11 or above.

iii. Sample (iii.) yielded a moderately soluble light brown powder. 0.25 grams in 50 ml. gave a pH of 11 or above. This solution also showed suspended fine particles as in sample (iii.).

EXAMPLE 19

2.5 grams of KOH in 20 ml. of water was added to 5.0 grams of each of the crude chars produced in (7) above. These were then dried for 30 minutes in an oven at 530°F.

a. Sample (7) (a.) yielded a dark brown powder, 0.25 grams of which in 50 ml. of water gave a dark brown solution of pH 10.

b. Sample (7) (b.) yielded a similar dark powder which was less soluble than (17) (a.) or (b.) 0.25 grams in 50 ml. of water gave a pH of 9.

EXAMPLE 20

10-gram samples of the chars from the first garbage tests, samples (1), (2) and (3) above, were each soaked in 25 ml. of water containing 5 grams of $Ca(OH)_2$, dried at 240° – 260°F, and heated for five minutes at 530°F. The pH was tested with 0.25 grams of sample dissolved in 50 ml. of water.

a. Sample (1) yielded a dark brown powder which was soluble, with a few undissolved solids. The pH was about 10.

b. Sample (2) yielded a black powder which was somewhat soluble, giving a brown solution with many undissolved solids, and a pH of 9.

c. Sample (3) yielded a brown powder which was slightly soluble, giving a light brown solution, of pH 8 or 9.

EXAMPLE 21

15 ml. of reagent KOH was added to char (8) above, and this slurry was heated at 240°F for 1½ hours, yielding a brownish-black product with some white alkali residue. This material was somewhat soluble in water, producing a brown solution. Further heating at 240°F for 2 hours yielded a brown solid of low solubility.

EXAMPLE 22 a. 15 ml. of reagent KOH and 3 ml. of water were added to water washed char (9) (a.) above, and mixed thoroughly, then heated to 450°F for 15 minutes. The black residue produced weighed 18.7 grams and was highly soluble in water. 1 grams dissolved in 100 ml. of water gave a dark brown solution of pH 10 to 11.

b. 15 ml. of reagent KOH and 20 ml. of water were added to char (9) (b.) above, and mixed thoroughly. This slurry was heated to 450°F for 15 minutes, yielding 25 grams of black solid residue. This residue is of moderate solubility, giving a brown solution and much suspended fines. 1 gram in 100 ml. of water gives a pH of about 11.

c. 15 ml. of reagent KOH and 10 ml. of water were added to char (9) (c.) above, and the resultant slurry was heated to 450°F for 15 minutes. 16 grams of brownish-black material resulted. 1 gram of this material gave a pH of about 11 when dissolved in 100 ml. of water. The material was quite soluble, forming a dark brown solution with some suspended fines.

B. Using Alkali-Metal Carbonates.

EXAMPLE 23 a. 4 grams of humus-like char (13) (a.) was then soaked in 20 ml. of a solution containing 2 grams of $K_2CO_3$. Overnight heating at 240°F produced a brownish-black residue of moderate solubility in water. 1 gram placed in 100 ml. of water produced a light brown solution of pH 7. Fusion had apparently occurred with those portions of the sample which had charred in the first step.

b. 4 grams of char (13) (b.) was fused overnight at 240°F with 2 grams of $K_2CO_3$. The resultant dark brown material was highly soluble in water, 1 gram in 100 ml. of water giving a dark brown solution of pH 9.

c. Fusion of 4 grams of char (13) (c.) with 2 grams of $Na_2CO_3$, as above, yielded a partially-soluble dark brown material. Extent of fusion apparently corresponds to extent of charring in first step.

d. Fusion of 4 grams of char (13) (c.) with 2 grams of $Na_2CO_3$ gave mostly soluble dark brown material, which produced a dark brown solution of pH 9 when 1 gram was added to 100 ml. of water. Extent of fusion appears to correspond to extent of charring.

IV. Miscellaneous Examples

EXAMPLE 24

The sodium salts of examples (14) (a.) and (b.) were acidified using HCl to a pH of 6.5 to yield black humic acid precipitates, which were separated by decantation and subsequent filtration. The precipitates were washed with very dilute HCl and dried.

Analyses of these and similar products shows them to be humic-acid-like compounds, containing carboxylic acid and hydroxyl groups, of a basic structure approximately $(C_{23}H_{22}O_6)n$.

EXAMPLE 25

The humic acid salts from examples (15), (16), (17), (19) and (20) were mixed together, dissolved in water, and acidified with dilute sulfuric acid to a pH of approximately 7 to yield precipitates. These were not rinsed, but were dried by evaporation so as to avoid loss of trace minerals present in the original sample and salts added in steps I through IV. The dried sample was analyzed for nitrogen, potash, and phosphate to determine possible value as a fertilizer. The results of this analysis showed:

| | |
|---|---|
| Total nitrogen | 1.51% |
| Potash | 17.35% |
| Phosphate (as phosphoric acid) | 1.30% |

EXAMPLE 26

Examples (21) and (22) were mixed together and treated in a similar manner, giving the following results:

| | |
|---|---|
| Total nitrogen | 0.14% |
| Potash | 35.65% |
| Phosphate (as phosphoric acid) | 0.58% |

The potash content of the final product could be decreased (or increased) by controlling the amount of potassium hydroxide or carbonate so as to give optimum concentration for use as fertilizer. Ammonium acid phosphate could be used in the neutralization to control nitrogen and phosphate content.

EXAMPLE 27

Attempts to ignite char (3), humus salts (20) and (22) (a.,) (b.) and (c.), and humus (26) and (27), using an 1,800°F oxyacetylene torch caused a reddish glow in the samples, but no self-sustaining combustion could be initiated.

We claim:
1. A method for providing a soil conditioner for arable land which comprises:
   a. intimately admixing organic waste material with a water-soluble inorganic acid selected from the group consisting of hydrochloric acid, sulfuric acid, and sulfur trioxide, until said acid penetrates and contacts substantially all of the organic waste material, the ratio of acid to organic waste on a dry weight basis being between about 1:30 and 1:2;
   b. reacting the resulting mixture by heating to a temperature between about 200° and 300°F under conditions which rapidly remove water from the reaction zone, until said organic waste material is converted to an essentially dry, water-insoluble black, humus-like char which is substantially insoluble in alkaline solutions below about 240°F;
   c. contacting said char material with a reactant selected from the group consisting of alkaline substances and water to remove residual acids from said char;
   d. mixing an alkaline compound with said char, said alkaline compound being selected from the group consisting of alkali-metal hydroxides, silicates, and carbonates, and alkaline-earth hydroxides, the ratio of said alkaline compound to said humus-like char being from about 1:20 to 2:3 on a dry weight basis;
   e. heating said char/alkaline compound mixture to a temperature between about 240° and 550°F until the char reacts with the alkaline compound to produce water-soluble salts of black, humic-acid-like materials.

2. A process as in claim 1, wherein said char includes residual inorganic acids and said acids are recovered for re-use by contacting said char with water.

3. A method as in claim 1, wherein the acid-charring reaction is conducted at a temperature between about 220° and 240°F.

4. A method as in claim 1, wherein the reaction of the humus-like material in the char with the alkaline compound is conducted at a temperature between about 475° and 530°F.

5. A method as in claim 2, wherein the reaction of the humus-like material in the char with the alkaline compound is conducted at a temperature between about 475° and 530°F.

6. A method for easily disposing of organic waste materials without polluting the environment, which comprises:

a. intimately admixing organic waste material with a water-soluble inorganic acid selected from the group consisting of hydrochloric acid, sulfuric acid, and sulfur trioxide, until said acid penetrates and contacts substantially all of the organic waste material, the ratio of acid to organic waste being between about 1:30 and 1:2 on a dry weight basis;

b. reacting the resulting mixture by heating under conditions which rapidly remove water from the reaction zone to a temperature above 200°F until the organic waste material is converted to as essentially dry, water-insoluble, humus-like black char which is substantially insoluble in alkaline solutions below about 240°F, said char including residual acids and water-soluble impurities therein;

c. removing said residual acid and water-soluble impurities from said char by washing said char with water.

7. A method as in claim 6, wherein the acid recovered in the wash water is reused in the charring reaction.

8. A method for easily disposing of organic waste materials without polluting the environment, which comprises:

a. intimately admixing organic waste material with a water-soluble inorganic acid selected from the group consisting of hydrochloric acid, sulfuric acid, and sulfur trioxide, until said acid penetrates and contacts substantially all of the organic waste material, the ratio of acid to organic waste being between about 1:30 and 1:2 on a dry weight basis;

b. reacting the resulting mixture by heating under conditions which rapidly remove water from the reaction zone to a temperature above 200°F until the organic waste material is converted to an essentially dry, water-insoluble, humus-like black char which is substantially insoluble in alkaline solutions below about 240°F, said char including residual acids and water-soluble impurities therein;

c. neutralizing said residual acid in the crude char with an alkaline compound of accepted fertilizing value, said alkaline compound being selected from the group consisting of ammonia and ammonium compounds, and compounds of sodium, potassium, magnesium, and calcium.

9. A process as in claim 1, wherein said char includes residual inorganic acids and said acids are neutralized by contacting said char with an alkaline substance.

10. A method for easily disposing of water-containing organic waste materials without polluting the environment, which comprises:

a. admixing organic waste material with toluene and refluxing the mixture;

b. separating the vaporizing and recondensing water from the toluene in a water trap;

c. adding to said refluxing waste material and toluene an acid selected from the group consisting of sulfuric acid, sulfur trioxide, hydrochloric acid, benzene sulfonic acid and toluene sulfonic acid, the ratio of acid-to-organic waste being between about 1:30 and 1:2 on a dry weight basis;

d. reacting the resulting mixture by heating under conditions which rapidly remove water from the reaction zone to a temperature above 200°F until the organic waste material is converted to an essentially dry, water-insoluble, humus-like black char which is substantially insoluble in alkaline solution below about 240°F, said char including residual acid and water-soluble impurities therein; and e. removing said residual acid and water-soluble impurities from said char by washing said char with water.

* * * * *